June 23, 1936.  M. B. A. DORING  2,045,179
ROLLING PRESSURE BRAKE AND CLUTCH
Filed Oct. 20, 1930
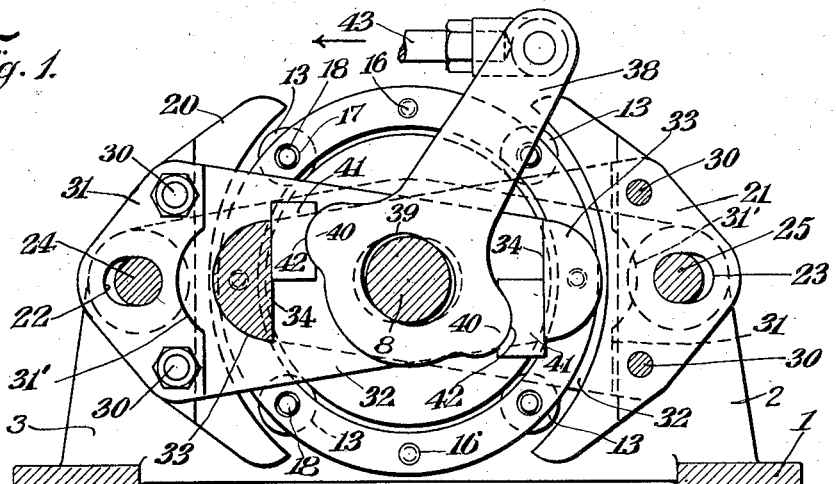
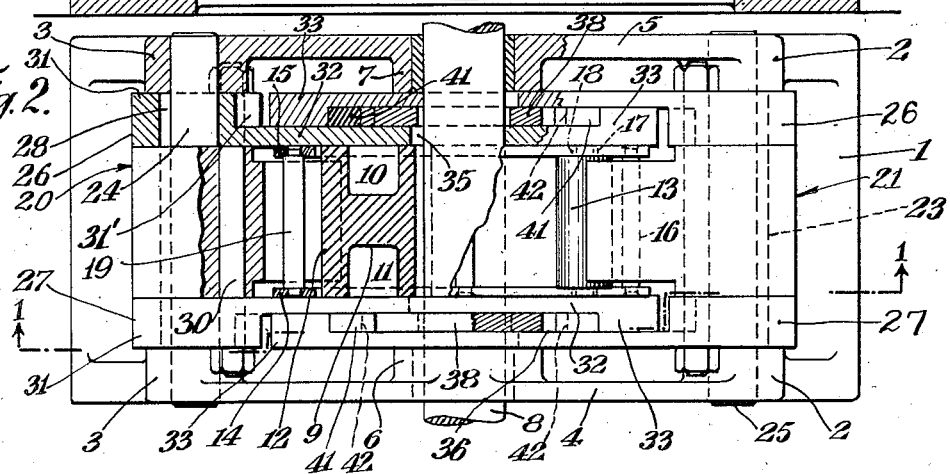
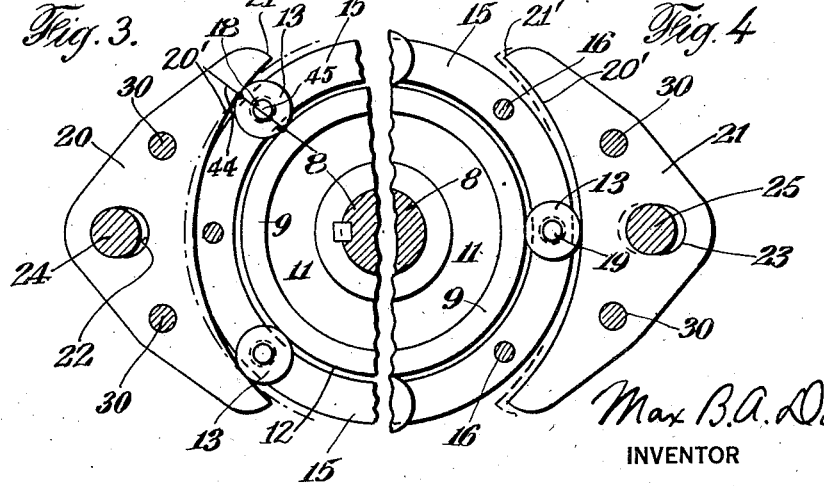
Max B. A. Doring
INVENTOR
BY Prindle Bean & Mann
ATTORNEY Patented June 23, 1936

2,045,179

UNITED STATES PATENT OFFICE 2,045,179

ROLLING PRESSURE BRAKE AND CLUTCH

Max B. A. Doring, Brooklyn, N. Y., assignor to Doring Company, Inc., New York, N. Y., a corporation of New York Application October 20, 1930, Serial No. 489,730

24 Claims. (Cl. 188—75)

This invention relates to a rolling pressure brake and clutch, the principle of which is a "positive rolling pressure" utilized by means of a relatively simple device which performs the function of braking or clutching respectively through locking of its three elements without the creation of heat through rubbing friction, and also which is positive and certain in its action and under the control of the operator.

On account of the general misconception of the creation of heat in brakes the rubbing friction has been accepted as the only or most successful way for absorbing motion energy and this is done by pressing one or more stationary brake shoes or brake-bands upon a rotating drum and, to absorb the heat created through the rubbing contact of these two members by lining the latter with various heat-absorbing materials, which material however, while absorbing the heat more or less satisfactorily, is itself absorbed or destroyed sooner or later by the heat in turn.

These lined friction-brakes have continually to be readjusted and relined and to be protected against becoming dry or soaked with oil. Either condition prevents the brake from reaching its highest point of efficiency, which is the moment when the two brake members are "locked" and which condition is only possible after all air has been forced out from between the members, in other words, when a vacuum-like condition has been created between them.

Then and then only can the rubbing friction of the two brake members brake the rotating of the one member and stop the car, unless the momentum of the car has already been absorbed through the weight of the car acting upon the wheels, resulting in a "rolling pressure of the wheels upon the road".

The locking of the brake members of a friction-brake depends not only upon a number of conditions, which are difficult to control, but the locking does not always result in stopping the car. If the locking took place before the momentum of the car was absorbed, the car would skid till the additional rubbing friction of the now stationary wheels upon the road had absorbed what was left of the momentum, which condition is not only dangerous in itself, but also the hereby created heat is destructive to the tires.

On the other hand, if the friction brake is applied "easy", that is, slowly, resulting in a prolonged rubbing friction, more heat is created, although the amount of the mechanical energy to be transformed into heat must be exactly the same as in the case of quick application of the brake, if other conditions are equal.

For this reason the driver of a car is advised to use the compression-resistance of the engine in place of or in addition to the brakes, to save the latter from burning up by throwing his transmission into low gear.

It is therefore important to construct a brake which provides;

1. An increase of pressure without automatically locking the brake members before the momentum of the car is completely absorbed, but to have such locking under the control of the operator.

2. The application of the highest pressure as an added load in fact in the shortest possible time to create the least possible amount of heat.

3. The elimination of readjustment and relining so that the brake is self-adjusting.

4. The application of a "rolling pressure" without "rubbing friction".

To the accomplishment of the foregoing and such other objects as may hereinafter appear this invention consists in the construction, combination, and arrangement of parts hereinafter described and then sought to be defined in the appended claims, reference being had to the accompanying drawing forming a part hereof, and which shows merely for the purpose of illustrative disclosure, a preferred embodiment of my invention, it being expressly understood, however, that various changes may be made in practice within the scope of the claims without digressing from my inventive idea.

In the drawing—

Figure 1 is a side elevation of the brake shown partly in section taken on line 1—1 of Figure 2.

Figure 2 is a top plan view of Figure 1, parts being shown in section and parts omitted to facilitate the disclosure, and Figures 3 and 4 are fragmentary sectional views of the braking or locking elements of the device in different positions.

Referring now to the drawing, the reference numeral 1 designates a base or other suitable support, having the end supporting members 2 and 3 extending from the base 1 at each end thereof, there being two such end supports at each end of the base. These supports are connected by wall portions 4 and 5, each of the portions 4 and 5 being provided with apertured projections 6 and 7 which are adapted to receive the main shaft 8. Keyed or otherwise suitably secured to the shaft 8, is a drum 9 having cut away portions 10 and 11 which reduce the weight of the drum 9 without substantially reducing the strength thereof. The drum is provided with the annular bearing surface 12. Rotatably mounted upon the bearing surface 12 of this drum 9 are the rollers 13 which are mounted in the spaced rings 14 and 15. The rings 14 and 15 are held together by means of rivets or rods 16, and are also provided with alined holes 17 which are adapted to receive reduced ends 18 of the shafts 19 of the rollers 13. The spaced connected rings 14 and 15 and rollers 13 form a freely rotatable roller cage of substantially the same width as the drum 9. It is to be expressly understood that the number and positioning of the rollers may be varied without changing the principle of my invention.

Co-operating with the rollers 13 are the brake or locking shoes 20 and 21 which are normally spaced from the drum 9 and rollers 13. These shoes are formed with elongated openings 22 and 23 movably mounted on shafts 24 and 25, the shafts being supported in the end supports 2 and 3 of the base member 1, and permitting relative movement between the shafts and the shoes. It is to be noted that the number of these shoes may be varied.

The braking or locking surface of each shoe is curved as at 20' and formed eccentrically with the shaft 8 and therefore the ends 21' are positioned a sufficient distance from the drum 9 to allow the rollers 13 to always be received and guided into the space between each shoe and the drum 9.

The shafts 24 and 25 serve merely to hold and support the brake or locking shoes and allow them to be slidably mounted on said shafts due to the elongated or oval-shaped openings 22 and 23 in the shoes.

Mounted on the shaft 24 are spaced side plates 26 and 27 each of which is provided at one end with an elongated opening 28 which is in alinement with the elongated opening 22 in the brake shoe 20. The side plates 26 and 27 are positioned on each side of the brake shoe 20, and are rigidly connected therewith by means of the bolts or rods 30. Each of these side plates may have converging sides and at its wide end is provided with an apertured abutment 31 which is mounted on the shaft 24. Extending from this abutment is a thin flat arm portion 32 having an abutment 33 formed on the opposite end thereof. This abutment 33 is formed with a plane vertical surface 34. The abutment 33 is of less thickness or depth than the abutment 31. Each abutment 31 is provided with a curved cut away portion 31' on its inner side which is adapted to receive the curved end of abutment 33 of a co-operating side plate during the operation of the device. Each of these plates is provided with a central elongated or oval-shaped opening 35 which is adapted to receive the shaft 8, and which permits relative movement between these side plates and the shaft. A similar pair of side plates is mounted on shaft 25, but the plates are placed in reversed position with respect to the side plates mounted on shaft 24 so that each abutment 33 contacts with the outer surface of arms 32 of side plates 26 and 27, and due to this positioning and to the fact that the abutment 33 is of less thickness than the apertured abutment 31, a space 36 is formed between the arms 32, and between the abutments 33 of the respective side plates 26.

Mounted on the shaft 8 in the space 36 between the complementary side plates 26 are the operating levers 38, one of which is shown in Figure 1. These operating levers are formed with an elongated or oval-shaped opening 39 near one end thereof, so as to permit relative movement between the levers and the shaft 8. Each lever is also provided with cam-shaped projections 40 near the end provided with elongated opening 39. Mounted between the abutments 33 of the complementary side plates 26 and adapted to be forced against plane vertical surface 34 of the abutment 33 are the friction blocks 41 which are provided in one vertical face with cut away arcuate portions 42 which are adapted to receive the cam-shaped projections 40 on the actuating lever 38. Connected to the outer end of the lever 38 is an actuating arm or rod 43 which may be connected to a foot pedal or any other similar device to exert a force on said arm or rod.

My device develops substantially no heat due to the rolling pressure construction and is therefore a more durable structure which needs less attention than the ordinary brakes now in use.

While I have described my device in connection with a brake, it is to be expressly understood that the device may also be used as a clutch. On account of the planetary or epicyclic arrangement of the three elements of this device it is obvious that, the device could be used with results, which are the exact opposite from the one so far described. Used as a brake the purpose of locking the three elements is to stop a rotating member and put it into a state of rest or condition similar to the shoes and their support, that is, to be held stationary. If, however, the support of the shoes, both of which form one unit, would be allowed to revolve around the common center of all three elements, the drum on the driven shaft could act as the driver and through wedging of the caged rollers the three elements would be locked as in the first case but would now be forced to turn together, that is, the shoes would now be put into the same condition as the drum rotating.

The application of my device as here described would make it a clutch, in which the objections of heating up, burning out of the lining and unwanted slipping are eliminated, but having such slipping fully under the control of the operator for the purpose of easy starting or gradual stopping, while the power or speed, when once the members are locked, is transmitted positively.

The operation of the device will now be described. With the shaft 8 rotating at any speed, it will be apparent that the drum 9 being connected thereto will also rotate, and the rollers 13, rotatably mounted in the spaced rings 14 and 15. When it is desired to stop the rotation of the shaft 8 the arm or rod 43 is actuated in the direction of the arrow shown in Figure 1, and the top of lever 38 is moved in the same direction. The cam portions or projections 40 on the lever 38 will force the blocks 41 outwardly against the abutments 33 on the complemental pairs of side plates 26 and 27. The brake shoes being connected to the side plates, and both the side plates and the brake shoes having elongated openings which receive the rods or shafts 24 and 25, they are moved inwardly toward the rotating drum and the rollers 13 are wedged between the eccentric surface of the braking shoes and the drum 9, as shown in Figure 3, the three elements are pressed together and the rotation of the shaft is stopped by the rolling pressure action. When the rollers 13 are in the position shown in Figure 3 and the brake is applied, a wedge is formed due to the eccentric shape of the brake shoe and the cage and drum will be brought gradually to a standstill. The rollers and cage continue to rotate for a while and an angular pressure on the rollers is obtained and the rollers do postive work by pushing or lifting the brake shoes out of the way of the path of the rollers. During this time there will be movement of the brake shoes toward and away from the drum until the drum stops rotating. By this means the energy of the rotating mass is absorbed. In Fig. 3 I have shown a line 44 connecting the points of contact of the roller 13 with the sides of the wedge formed by the eccentric face on shoe 20 and the circular surface 12 of the drum 9. The line 44 does not pass through the center 45 of the roller 13. From this showing it will be clear that the points of contact on a roller lie on a chord of the circle rather than on the diameter.

In Fig. 4 the roller 13 is shown in a different position, but some work is being done because the brake shoe 21 is pressed against the surface of the roller 13 and the roller is pressed against the drum 9. Further rotation of the roller will move the brake shoe outwardly. The dotted lines in Fig. 4 show the amount of movement which has been given to the brake shoe 21 as the roller passes between the brake shoe 21 and the drum 9.

If, however, the pressure is applied with the rollers in position as shown in Figure 3, and if this pressure is released before the drum has come to a standstill, the rollers with their cage will be turned at half the speed of the drum till the wedges are open and the rollers pass through, with the result that the movement of the drum has been retarded proportionately, i. e., according to the "added load in fact" without rubbing or heating friction. This action is due to the epicyclic arrangement of the three elements of my brake.

The working principle of this brake, which is "a positive rolling and wedging action in oil" with the low coefficient of friction of .0015 against .5 for dry rubbing friction as in the conventional friction brakes, results in the latter producing about 333 times as much heat as this new brake, since the heat produced in brakes is due to the friction of the surfaces, and the work of the friction is due to the normal pressure exerted times the coefficient of friction and the velocity.

From the foregoing it will be apparent that I have invented a device which is relatively simple in construction, but which is reliable and effective for the purposes stated.

Since the principle of my invention consists of the "locking of its three elements" for the purpose of either to stop movement together or to turn together, it is obvious that this same principle here illustrated as an external brake, could also be applied as an internal brake without changing the character of the invention as it is applicable as a clutch.

What I claim is:

1. In a device of the character described, a rotatable shaft, a drum thereon, a rotatable cage having a roller mounted on said drum for free rotation thereon, and means for pressing said roller in a positive rolling action between said means and said drum for gradually stopping the rotation of said shaft, the pressure being applied at points of contact on a roller so that a line connecting these points will lie on one side of the center of the roller and an angular pressure on the roller is obtained.

2. In a device of the character described, a rotatable shaft, a drum connected therewith, means mounted on said drum for relatively free rotation thereon, a shoe having an eccentrically curved working surface adapted to engage said means, and means for pressing said shoe against said means rotatably mounted on said drum for retarding the rotation of said shaft.

3. In a device of the character described, a rotatable shaft, a drum for rotation therewith, pressure roller means on said drum for free rotation thereon, a shoe, means for mounting said shoe adjacent said drum, the surface of said shoe being eccentrically shaped, and means for moving said shoe to gradually lock said elements together to stop rotation of said shaft.

4. In a device of the character described, a rotatable shaft, a drum on said shaft, roller means rotatably mounted on said drum, an eccentrically faced brake shoe, a plate member connected to said brake shoe, and means for moving said plate member to bring said brake shoe against said roller means and said drum to exert a positive rolling braking pressure on said shaft.

5. In a device of the character described, a rotatable shaft, a drum for rotation therewith, rotatable spaced rings with a plurality of rollers mounted on said drum, a plurality of brake shoes, each brake shoe having an eccentrically shaped working surface, and means for moving said brake shoes for wedging said rollers between said brake shoes and said drum, for locking the said shaft, said drum, said rollers and said shoes together in a rolling action without rubbing friction.

6. In a device of the character described, a rotatable shaft, a drum mounted thereon, cage means mounted on said drum and provided with a plurality of rollers, a brake shoe provided with an elongated opening, a shaft for receiving said opening in said brake shoe, plate means connected to said brake shoe and mounted on said second mentioned shaft, and means for moving said plate means to cause said brake shoe to frictionally engage said rollers.

7. In a device of the character described, a rotatable shaft, a drum for rotation therewith, cage means on said drum including a roller and adapted for free rotation on said drum, an eccentrically faced brake shoe, and means for moving said brake shoe to gradually lock said roller, said drum, and said shoe together in an angular rolling action.

8. In a device of the character described, a rotatable shaft, a drum for rotation therewith, cage means provided with a plurality of rollers mounted on said drum, a plurality of brake shoes, each of said brake shoes being eccentric with said drum, and means for moving said brake shoes for gradually arresting the rotation of said rollers between said brake shoes and said drum in a rolling action under a positive angular pressure.

9. In a device of the character described, a rotatable shaft, a drum mounted thereon, cage means mounted on said drum, said cage means including spaced rings provided with a plurality of rollers, brake shoes adjacent said cage means, each brake shoe being provided with an elongated opening near one end, a shaft receiving said opening in said brake shoe, plate means and means for moving said plate means on said second mentioned shaft to cause said brake shoes to exert a positive pressure upon said rollers.

10. In a device of the character described, a rotatable drum, a cage having a plurality of locking rollers and adapted to rotate at half the speed of said drum, a plurality of eccentrically faced shoes and means for gradually locking the said three elements together through a positive rolling action.

11. In a device of the character described, a rotatable shaft, a drum thereon, a cage having a roller mounted on said drum, an eccentrically faced shoe and means for pressing said roller between said shoe and said drum for gradually locking said elements together in an angular rolling pressure exerted by said means without sliding friction.

12. In a device of the character described, a shaft, a drum thereon, rotatable roller-cage means, shoes having symmetrically elevated portions on their braking surfaces to be lifted by the rotatable cage-means, and means to exert an angular pressure upon the rollers in said cage means to retard the rotation of said drum without rubbing friction.

13. In a device of the character described, a shaft, a drum thereon, rotatable roller-cage means, brake shoes having elevated portions on their braking surfaces, said shoes being lifted by the rotating cage means by exerting a force on the elevated portions of said shoes without sliding friction to exert a positive braking pressure upon said drum.

14. In a device of the character described, a shaft, a drum thereon, rotatable cage means associated with said drum and adapted to exert a positive, angular, rolling pressure upon said drum, and means to gradually lock said shaft, said drum and said rotatable cage means together.

15. In a device of the character described, a shaft, a drum thereon, roller cage means rotatable at one-half the speed of said drum, and means for angularly pressing the rollers in said cage means against the surface of said drum by exerting a pressure on a roller at points of contact lying on one side of the center of the roller.

16. In a device of the character described, a shaft, a drum thereon, independent rotatable roller cage means, associated with said drum and means for angularly pressing the rollers in said cage means against said drum for effecting a braking pressure on said shaft by exerting a pressure on a roller at points of contact lying on one side of the center of the roller.

17. In a device of the character described, a rotatable shaft, a drum thereon, independent roller cage means rotatable at one-half the speed of said drum, a braking member, and means for pressing one or more of the rollers in said cage means between said braking member and said drum for gradually retarding the rotation of said shaft in an angular rolling pressure.

18. In a device of the character described, a shaft, a drum thereon, independent rotatable roller cage means associated with the drum, and means for pressing the rollers in said cage means against the surface of said rotating drum in a positive, angularly exerted rolling pressure, the pressure being applied at points of contact on a roller so that a line connecting these points will lie on one side of the center of the roller and an angular pressure on the roller is obtained.

19. In a device of the character described, a shaft, a drum thereon, roller cage means associated with said drum for free rotation thereon and means for pressing one or more rollers in said rotating cage means against said drum to gradually arrest the rotation of said shaft, the pressure being applied at points of contact on a roller so that a line connecting these points will lie on one side of the center of the roller and an angular pressure on the roller is obtained.

20. In a device of the character described, a rotatable shaft, a drum mounted thereon, cage means on said drum and provided with a plurality of rollers, eccentrically engaging brake shoes adjacent said cage means, means adapted to cooperate with each of said brake shoes and means for moving said cooperating means to cause said brake shoes to exert a positive pressure upon said rollers, the pressure being applied at points of contact on a roller so that a line connecting these points will lie on one side of the center of the roller and an angular pressure on the roller is obtained.

21. In a device of the character described, a rotatable drum, a roller cage mounted on said drum for rotation thereon at half the speed of said drum, a braking member, and means for gradually locking said drum, said roller cage and said member together without rubbing friction, the pressure being applied at points of contact on a roller so that a line connecting these points will lie on one side of the center of the roller and an angular pressure on the roller is obtained.

22. In a device of the character described, a rotatable shaft, a drum connected therewith, means associated with said drum and freely rotatable with respect to said drum, a shoe having an eccentrically curved working surface adapted to engage said means when rotation of said shaft is to be retarded or stopped, and means for moving said shoe and pressing said rotatable means against said drum for retarding the rotation of said shaft.

23. In a device of the character described, a rotatable shaft, a drum secured thereto, roller cage means associated with said drum and adapted to rotate at one half the speed of said drum, a braking member having an eccentrically curved working surface adapted to engage the rollers in said cage means when rotation of said shaft is to be retarded or stopped, and means whereby said braking member is moved to press said rollers in said cage means against said drum for retarding the rotation of said shaft.

24. In a device of the character described, a rotatable shaft, a drum secured thereto, a cage having a roller associated with said drum, said roller being rotatably mounted with respect to said drum, an eccentrically faced shoe, and means whereby said roller is pressed between said shoe and said drum for gradually locking said elements together without sliding friction and through a positive rolling action.

MAX B. A. DORING.